(12) United States Patent
Ohrui et al.

(10) Patent No.: US 8,545,080 B2
(45) Date of Patent: Oct. 1, 2013

(54) SWITCH MODULE

(75) Inventors: Manabu Ohrui, Minato-Ku (JP);
Takahisa Akatsuka, Minato-Ku (JP);
Hitoshi Uchida, Minato-Ku (JP);
Kazuki Ozaki, Minato-Ku (JP)

(73) Assignee: Nippon Mektron, Ltd., Minato-Ku (JP)

( * ) Notice: Subject to any disclaimer, the term of this patent is extended or adjusted under 35 U.S.C. 154(b) by 18 days.

(21) Appl. No.: 13/497,160

(22) PCT Filed: Oct. 28, 2010

(86) PCT No.: PCT/JP2010/069148
§ 371 (c)(1),
(2), (4) Date: Mar. 20, 2012

(87) PCT Pub. No.: WO2011/102019
PCT Pub. Date: Aug. 25, 2011

(65) Prior Publication Data
US 2012/0182760 A1 Jul. 19, 2012

(30) Foreign Application Priority Data
Feb. 17, 2010 (JP) .................................. 2010-032616

(51) Int. Cl.
*F21V 8/00* (2006.01)
(52) U.S. Cl.
USPC ........... 362/602; 362/23.04; 362/802; 385/16
(58) Field of Classification Search
None
See application file for complete search history.

(56) References Cited

U.S. PATENT DOCUMENTS

| 5,771,321 A * | 6/1998 | Stern ................................. 385/31 |
| 2007/0039809 A1 | 2/2007 | Aihara et al. |
| 2008/0151526 A1 | 6/2008 | Miyashita et al. |
| 2009/0095612 A1 | 4/2009 | Tanabe et al. |
| 2009/0231857 A1* | 9/2009 | Ito et al. .................... 362/311.14 |
| 2009/0266691 A1 | 10/2009 | Ishioka et al. |
| 2011/0149573 A1 | 6/2011 | Lee et al. |

FOREIGN PATENT DOCUMENTS

| JP | 2004-139983 A1 | 5/2004 |
| JP | 2007-087749 A1 | 4/2007 |
| JP | 2008-152951 A1 | 7/2008 |
| JP | 2008-159541 A1 | 7/2008 |
| JP | 2008-226844 A1 | 9/2008 |
| JP | 2009-094036 A1 | 4/2009 |

(Continued)

OTHER PUBLICATIONS

International Search Report dated Nov. 30, 2010 (with English translation).

*Primary Examiner* — Ashok Patel
(74) *Attorney, Agent, or Firm* — Burr & Brown (57) ABSTRACT

In a switch module which is arranged in opposition to a key substrate, the switch module is provided which is able to reduce an amount of light leaking out from the vicinity of an end of a light guiding member in the direction of key parts, so that the key parts can be illuminated in a uniform manner by the light which advances in the interior of the light guiding member. A switch module is provided with a circuit substrate that has a metal dome sheet mounted on a surface thereof which is arranged in opposition to a key substrate, a light guiding sheet that is arranged between the key substrate and the circuit substrate, an LED, and a reflector that makes the light emitted from the LED incident into the light guiding sheet from an end thereof, wherein key parts are able to be illuminated by the switch module.

12 Claims, 6 Drawing Sheets

(56) References Cited

FOREIGN PATENT DOCUMENTS

| JP | 2009-140871 A1 | 6/2009 |
| JP | 2009-187855 A1 | 8/2009 |
| JP | 2009-246821 A1 | 10/2009 |
| JP | 2010-015794 A1 | 1/2010 |
| JP | 2010-034008 A1 | 2/2010 |

* cited by examiner

<COMPARATIVE EXAMPLE>    <PRACTICAL EXAMPLE 1>

SWITCH MODULE

TECHNICAL FIELD

The present invention relates to a switch module which is arranged in opposition to a key substrate of electronic equipment such as a cellular phone, a notebook PC, and so on.

BACKGROUND ART

Figure 5:
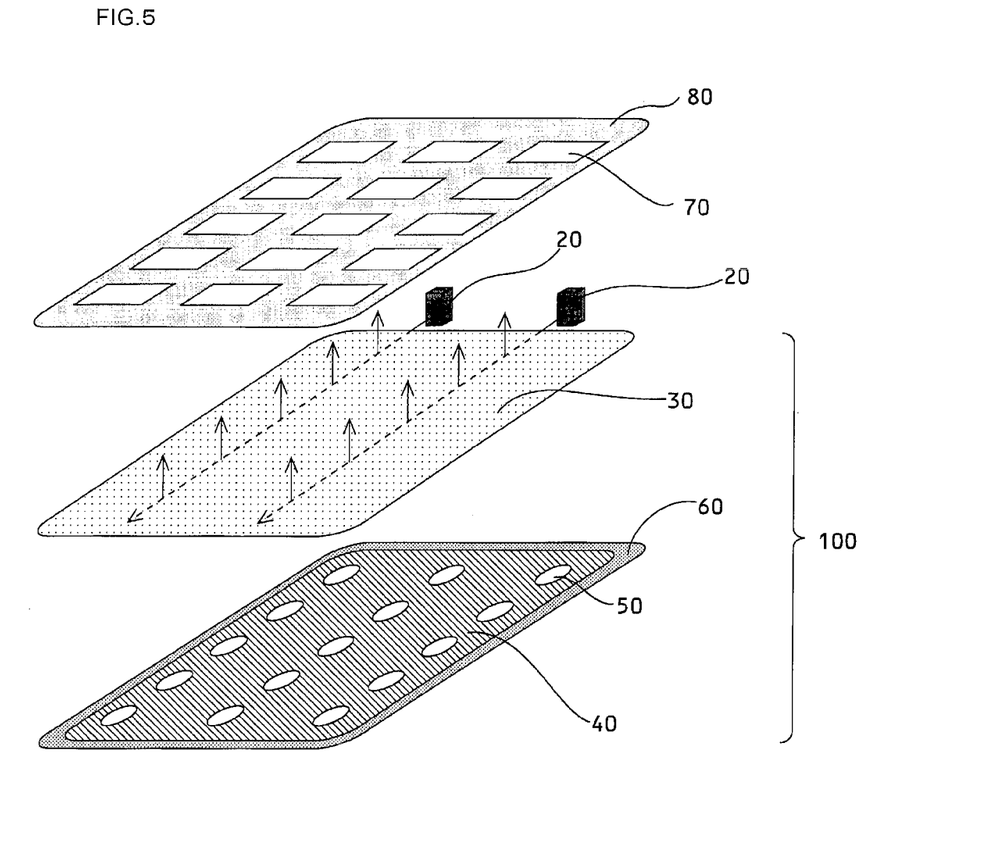
FIG. 5 is a schematic perspective view of a conventional switch module.

In the past, electronic equipment such as a cellular phone, a notebook PC, etc., is provided with a key substrate having key parts, and further with a switch module which is arranged in opposition to the key substrate so as to change over between the on and off states of an electric connection according to the contact and non-contact of a key top. In FIG. 5, there is shown a schematic perspective view of a conventional switch module 100 which is arranged in opposition to a key substrate 80 having a plurality of key parts 70. In addition, in FIG. 6, there are shown schematic cross sectional views of the switch module 100 illustrated in FIG. 5.

Figure 6:
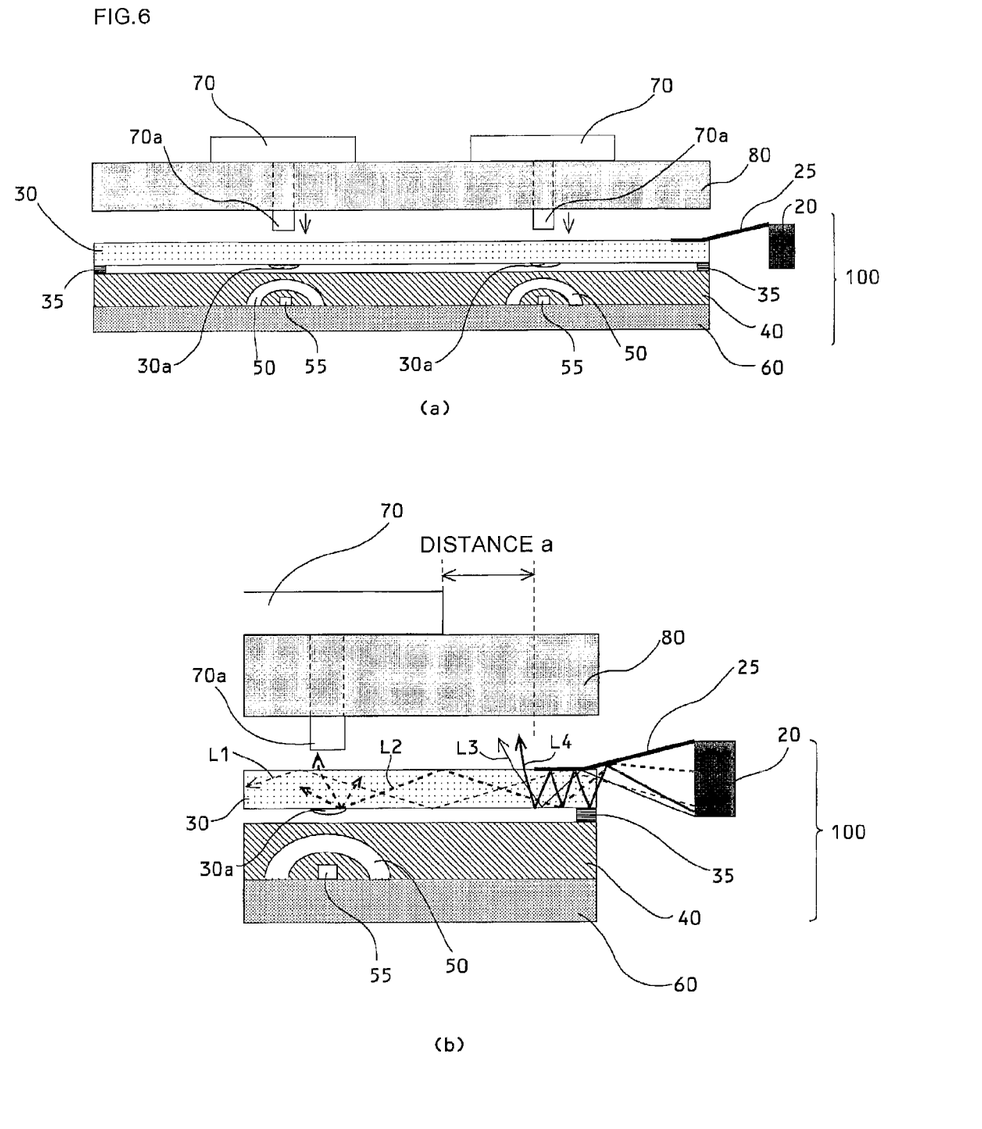
FIG. 6 is a schematic cross sectional view of the conventional switch module.

As shown in FIG. 6(a), the switch module 100 is provided with metal domes 50 each having electrodes 55 contained therein, a circuit substrate 60, a light guiding member 30, and LEDs (Light Emitting Diodes) 20 as light emitting devices. The metal domes 50 are integrally held on the circuit substrate 60 by means of a metal dome sheet 40, and the light guiding member 30 is mounted on the metal dome sheet 40 at a predetermined distance or interval formed therebetween by means of an adhesive layer 35. In addition, on a lower surface of the light guiding member 30, there are formed a plurality of light scattering processed parts 30a, which have been subjected to prism processing, or printing processing in which white ink is printed in a dot-like manner, or the like, and between the light guiding member 30 and each LED 20, there is arranged a reflector (reflection member) 25 for introducing the light emitted from the LED 20 into the light guiding member 30 from one end thereof in an efficient manner.

According to such a construction, it becomes possible to change over between the on and off states of a switch by electrical contact and non-contact between each metal dome 50 and the corresponding electrodes 55 due to a deformation of the metal dome 50 caused by a corresponding key part 70 being pushed down, and at the same time, the light guiding member 30 is arranged on a back surface of the key substrate 80, i.e., between the key substrate 80 and the metal dome sheet 40, so it becomes possible to illuminate the individual key parts 70 from the interior of the light guiding member 30 by causing the light, which has been emitted from each LED 20 and has entered the light guiding member 30, to be scattered by the light scattering processed parts 30a. Here, note that related techniques are disclosed in a first through a sixth patent document, as listed below.

PRIOR ART REFERENCES

Patent Documents

First Patent Document: Japanese patent application laid-open No. 2009-246821
Second Patent Document: Japanese patent application laid-open No. 2008-152951
Third Patent Document: Japanese patent application laid-open No. 2009-140871
Fourth Patent Document: Japanese patent application laid-open No. 2009-187855
Fifth Patent Document: Japanese patent application laid-open No. 2004-139983
Sixth Patent Document: Japanese patent application laid-open No. 2008-226844

SUMMARY OF THE INVENTION

Problems to be Solved by the Invention

However, in the above-mentioned conventional construction, there are the following problems.

In FIG. 6(b), there is schematically shown the direction of movement of light in the light guiding member 30. The light, which has been emitted from each LED 20 and has entered the light guiding member 30 from the one end thereof by means of the reflector 25, advances through the interior of the light guiding member 30, while repeating reflections on the upper surface and the lower surface of the light guiding member 30, for example, like a light indicated by L1 in this figure. In addition, like a light indicated by L2 in this figure, there is also a light scattered around by each of the light scattering processed parts 30a in such a manner that it comes out from the upper surface of the light guiding member 30 in the direction of a key part 70.

However, in the light which is incident into the interior of the light guiding member 30, like lights indicated by L3, L4 in the figure, there exist lights which leak out in the direction of the key substrate 80 from the upper surface of the light guiding member 30 in the vicinity of an end of the light guiding member 30, in spite of no formation of the light scattering processing parts 30a. As a result, there is a problem that on the surface of the key substrate 80, a region thereof from which the lights of L3, L4 leak out, i.e., a region in the vicinity of each LED 20, shines extremely too much as compared with the other regions thereof.

On the other hand, in general, with respect to switch modules which can illuminate key parts, there is a requirement for "uniformity in luminance" in which a plurality of key parts be lighted or illuminated at a luminance that is as uniform as possible. However, in order to satisfy the requirement for "uniformity in luminance" in the above-mentioned construction, it has to be avoided to arrange the key parts 70 in those regions in the vicinities of LEDs 20 which shine too much, and hence, it is necessary to keep a certain distance between each LED 20 and a key part 70 (i.e., the one closest to a corresponding LED 20). That is, it is necessary to set a "distance a" shown in FIG. 6(b) to be large, and hence the key part 7 can not be arranged in the vicinity of the LED 20. Therefore, this leads to restrictions on the arrangement design of the key parts 70 as well as an aesthetic design thereof. That is, in the conventional construction, it has been impossible to satisfy the requirement of easing the restrictions on the arrangement design and the aesthetic design of the key parts 70, while satisfying the requirement for uniformity in luminance.

Accordingly, the present invention has for its object to provide a switch module which is arranged in opposition to a key substrate, and which is able to reduce an amount of light leaking out from the vicinity of an end of a light guiding member in a direction toward key parts, so that the key parts can be illuminated in a uniform manner by the light advancing or propagating in the interior of the light guiding member.

Means for Solving the Problems

In order to achieve the above-mentioned object, the present invention resides in a switch module which is arranged in opposition to a key substrate having key parts, and which is characterized by comprising:

a circuit substrate that has an electrode layer formed on a surface thereof in opposition to said key substrate;

a light guiding member that is arranged between said key substrate and said circuit substrate;

a light source element that emits light; and a reflection member that causes the light emitted from said light source element to enter an interior of said light guiding member from an end of said light guiding member;

wherein by a movement of said key parts with respect to said electrode layer, an on and off of a switch is changed over, and at the same time, said key parts can be illuminated from the interior of said light guiding member by the light which has entered the interior of said light guiding member;

wherein said light guiding member has a first surface that is arranged in opposition to said key substrate, and a second surface that is arranged at an opposite side of said first surface so as to be in opposition to said circuit substrate; and wherein in the vicinity of said end in the second surface, there is formed a print pattern by ink of a light absorbing property on an optical path of the light which has been caused to enter the interior of said light guiding member by means of said reflection member, and which, after being reflected on the second surface, transmits through the first surface in the vicinity of said end, without being reflected on the first surface.

According to such a construction, in the second surface of the light guiding member, there is formed the print pattern by ink of a light absorbing property on the optical path of the light which, after being reflected on the second surface, transmits through the first surface in the vicinity of the end of the light guiding member, without being reflected on the first surface. With such a construction, it is possible to absorb the light leaking out from the vicinity of the end of the light guiding member by means of the print pattern. That is, it is possible to reduce the amount of light of the light leaking out from the vicinity of the end of the light guiding member. As a result, even if a key part is arranged close to the light source element, it is possible to avoid a problem that the key part shines too much as compared with the other key parts, so restrictions on an arrangement design as well as an aesthetic design of the key parts can be eased, and at the same time, a requirement for uniformity in luminance can be satisfied. Here, note that the print pattern is formed on only the optical path of the light which transmits the first surface in the vicinity of the end of the light guiding member. Therefore, it becomes possible for other light which advances through the interior of the light guiding member (the light which does not leak out from the vicinity of the end of the light guiding member) to illuminate the key parts to a sufficient extent, without being absorbed by the print pattern.

In addition, it is preferable that said reflection member be arranged so as to cover the first surface in said end, and it is also preferable that said print pattern be formed on the second surface on an optical path of the light which has been caused to enter the interior of said light guiding member by means of said reflection member, and which, after being reflected on the second surface, transmits through the first surface from the vicinity of an edge portion of said reflection member.

According to such a construction, the reflection member is arranged so as to cover the first surface in the end of the light guiding member, so it is possible to cause the light emitted from the light source element to enter the interior of the light guiding member in a more effective manner. In addition, the light leaking out from the edge portion of the light reflection member can be absorbed by means of the print pattern, thereby making it possible to reduce the amount of light of the light leaking out from the vicinity of the edge portion of the light reflection member. As a result, even if a key part is arranged close to the light source element, it is possible to avoid a problem that the key part shines too much as compared with the other key parts, so requirements for an arrangement design and an aesthetic design of the key parts as well as a requirement for uniformity in luminance can be satisfied at the same time.

In addition, it is preferable that said light guiding member be subjected to light scattering processing which is able to scatter the light having entered the interior of said light guiding member, whereby said key parts are able to be illuminated from the interior of said light guiding member by the light scattered in a portion thereof to which said light scattering processing has been applied.

According to such a construction, by scattering the light having entered the interior of the light guiding member, it becomes possible to illuminate the key parts in a suitable manner from the interior of the light guiding member by the light thus scattered.

Moreover, it is preferable that said light scattering processing be printing processing in which ink having a light scattering property is printed on said light guiding member, or three-dimensional shape processing in which a three-dimensional shape having a light scattering property is formed on said light guiding member.

According to such a construction, it becomes possible to apply the light scattering processing to the light guiding member by means of a simple processing method. Here, note that as the printing processing referred to herein, there is mentioned, for example, processing in which white ink is printed in a dot-like manner, and in addition, as the three-dimensional shape processing, there is mentioned processing in which rugged or concave and convex shapes, prismatic shapes, or the like can be formed on the reflection member by a processing method such as die machining, laser beam machining, or the like.

Further, it is preferable that said light scattering processing be applied to the second surface of said light guiding member.

According to such a construction, the light scattering processing and the print pattern by the ink of a light absorbing property are both applied to the same surface of the light guiding member, so it is possible to carry out these processings with good positional accuracy in the same step, thus making it possible to achieve improvement in the manufacturing efficiency as well as reduction in the manufacturing costs. In particular, in cases where printing processing is adopted as the light scattering processing, in a manufacturing process, these can be printed with good positional accuracy within the same process step by the use of the same printing equipment, so it becomes possible to further improve the manufacturing efficiency.

In addition, it is preferable that a sheet member with light transparency having a thickness of equal to or more than 100 μm and equal to or less than 300 μm be used for said light guiding member.

According to such a construction, by using the sheet member with light transparency having a thin thickness, it is possible to achieve the reduction in size of the switch module as a whole, and besides, the thickness of the light guiding member, which is placed between the key parts and the electrode layer, is thin, so a click feeling, which is transmitted to a user at the time when the user operates the key parts, can be improved.

Effect of the Invention

As described above, according to the present invention, in a switch module which is arranged in opposition to a key substrate, it becomes possible to provide the switch module which is able to reduce an amount of light leaking out from the vicinity of an end of a light guiding member in the direction of key parts, so that the key parts can be illuminated in a uniform manner by the light which advances in the interior of the light guiding member.

BEST MODE FOR CARRYING OUT THE INVENTION

Hereinafter, a mode for carrying out the present invention will be described in detail by way of example with reference to the attached drawings. However, the dimensions, materials, shapes, relative arrangements and so on of component parts described in the following embodiment are not intended to limit the scope of the present invention to these alone in particular as long as there are no specific statements.

EMBODIMENT

1: With Respect to the Overall Construction of a Switch Module

Figure 1:
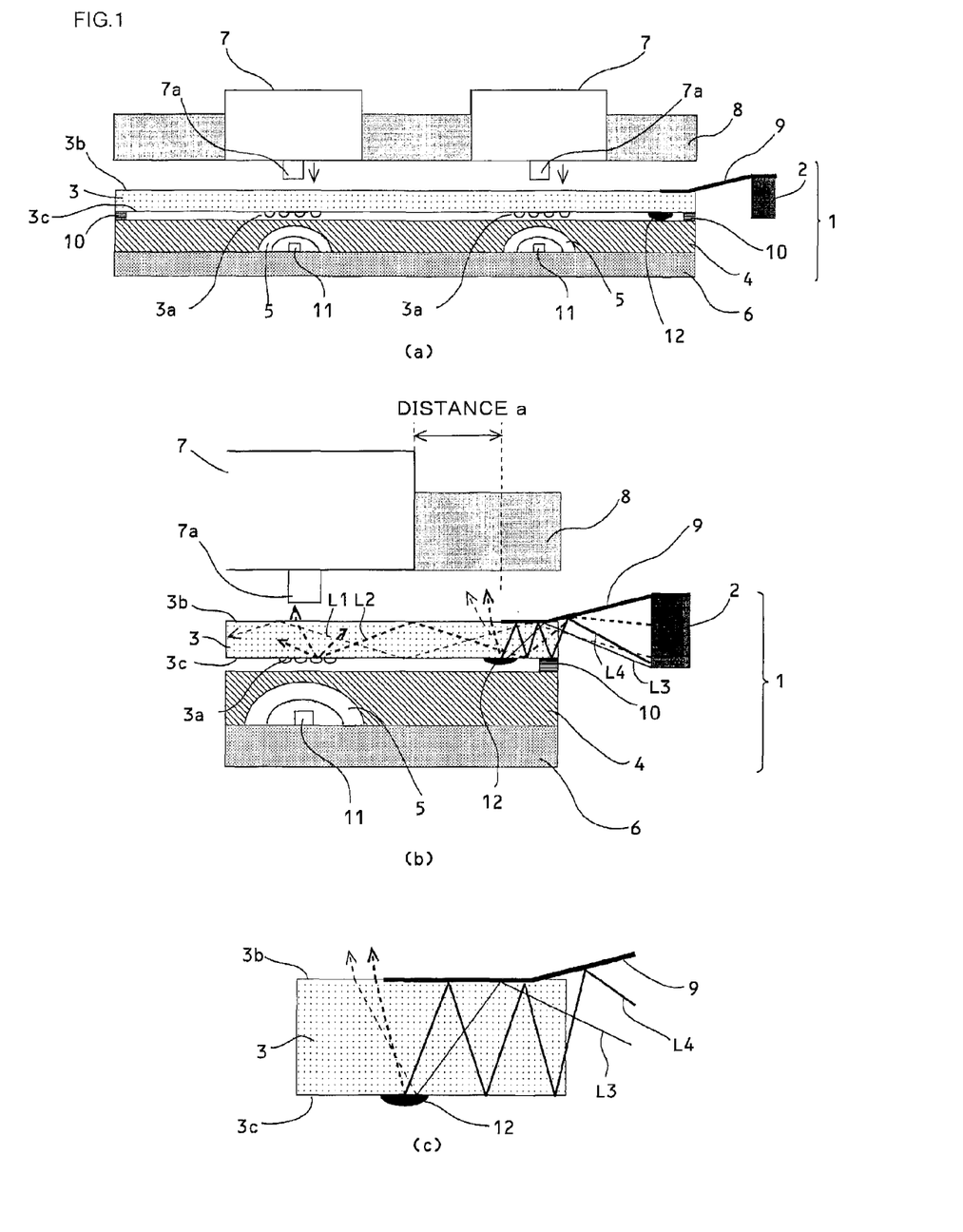
FIG. 1 is a schematic cross sectional view of a switch module according to an embodiment of the present invention.

Hereinafter, the overall structure of a switch module 1 according to an embodiment to which the present invention can be applied will be explained while referring to FIG. 1(*a*). FIG. 1(*a*) is a schematic cross sectional view of the switch module 1 according to this embodiment.

The switch module 1 according to this embodiment is arranged in opposition to a key substrate 8 having key parts 7, and can be used, for example, for a ten key substrate, a QWERTY key substrate, etc., in electronic equipment such as a cellular phone, a notebook PC, and so on. In addition, it can also be used for a touch panel, etc., too.

As shown in FIG. 1(*a*), the switch module 1 is provided with LEDs 2 as light emitting devices, a circuit substrate 6 having electrodes 11, a metal dome sheet 4 (an electrode layer) having a plurality of metal domes 5 for covering the electrodes 11, respectively, and a light guiding sheet 3 (a light guiding member) mounted on the metal dome sheet 4 by means of an adhesive layer 10. For the circuit substrate 6, it is possible to use an FPC (Flexible Printed Circuit) substrate. In addition, between each of the LEDs 2 and the light guiding sheet 3, there is arranged a reflector 9 (a reflection member) which serves to cause the light emitted from a corresponding LED 2 to enter the interior of the light guiding sheet 3 from one end of the LED 2 in an efficient manner.

According to such a construction, a key top 7*a* is moved downward in the figure to push the metal dome sheet 4, whereby a corresponding metal dome 5 is deformed so that the metal dome 5 is placed into contact with corresponding electrodes 11, thus resulting in a state in which the metal dome 5 and the electrodes 11 are electrically connected to each other, i.e., a switch is changed over from an off state into an on state. Here, note that in general for a switch module, from the point of view of operability, it is assumed to be desirable that when a user pushes down a key part, a sufficient click feeling be transmitted to the user, and according to this embodiment, the on and off of a switch is changed over due to the deformation of a metal dome 5 which has a fixed strength or rigidity, so a sufficient click feeling can be transmitted to the user. Also, note that the individual metal domes 5 are integrally adhered to the metal dome sheet 4, and in a manufacturing process, by attaching the metal dome sheet 4 with the metal domes 5 already mounted thereon to the circuit substrate 6, it becomes possible to attach the metal domes 5 with respect to the plurality of electrodes 11, respectively, with a sufficient degree of accuracy and in a simple step.

2: With Respect to the Light Guiding Sheet

The light guiding sheet 3 used in this embodiment will be explained. Although in this embodiment, a urethane rubber sheet (thermosetting) is used which has a thickness of 125 μm, a shore hardness of 97, and has light transparency, the material which is applicable as the light guiding sheet 3 is not limited to this, but a transparent sheet such as a polycarbonate film, a silicone rubber sheet, etc., may also be used. In addition, the thickness of the light guiding sheet 3 is not limited in particular, but it can be said to be more preferable that the thickness thereof be equal to or more than 100 μm and equal to or less than 300 μm. Here, note that the "transparent sheet" referred to herein does not necessarily mean a colorless transparent sheet, but the light guiding sheet 3 is not limited to a "colorless transparent" sheet as long as the light emitted from each LED 2 can transmit therethrough.

In this embodiment, the light guiding sheet 3 of such a thin thickness is used, so the reduction in size of the switch module 1 can be achieved, and besides, it becomes further possible to improve the sensitivity of the above-mentioned click feeling. Here, note that in the following, the explanation will be made that in the surfaces of the light guiding sheet 3, a surface (an upper surface in figures) at a side in opposition to the key substrate 8 is referred to as a "first surface 3*b*", and a surface (a lower surface in figures) at a side in opposition to the circuit substrate 6 is referred to as a "second surface 3*c*".

To the light guiding sheet 3, there is applied light scattering processing which serves to scatter the light having entered the light guiding sheet 3 into the second surface 3*c*. Here, as the light scattering processing, dot printing (printing processing) with white ink (i.e., ink having a light scattering property) is carried out by an ink-jet printer, so that white dots 3*a* are printed on the second surface 3*c* (although white ink is adopted here as the ink having a light scattering property, any ink other than white one may be used as long as it has a light scattering property). The white dots 3*a* are printed at locations corresponding to the key parts 7, respectively, as a result of which the light having coming from each LED 2 into the interior of the light guiding sheet 3 can be caused to scatter by the white dots 3*a*, thereby making it possible to illuminate the key parts 7 from the interior of the light guiding sheet 3 by means of the light thus scattered. Here, note that the dot density, the shape, etc., of the white dots 3*a* are not limited in particular, but for example, by increasing the number of dots of the white dots 3*a* in a region distant or remote from each LED 2 (i.e., a region to which light is transmitted while being attenuated), it becomes possible to illuminate key parts 7, even if arranged in the region distant or remote from the LED 2, with a sufficient amount of light.

In addition, the practical form of the light scattering processing is not limited to this, but may be a form in which three-dimensional shape processing by means of die machining, laser beam machining, or the like is applied to predetermined positions of the light guiding sheet 3, so that rugged or concave and convex shapes, prismatic shapes, or the like can be formed on the light guiding sheet 3. In this case, too, it becomes possible to illuminate the key parts 7 in a suitable manner by scattering the light by means of those portions which have been subjected to three-dimensional shape processing, similar to the white dots 3a. Here, note that the printing processing (the white dots 3a) is applied to the second surface 3c, but three-dimensional shape processing may be applied to the first surface 3b of the light guiding sheet 3. In this case, too, light is scattered in those portions of the first surface 3b to which the three-dimensional shape processing has been applied, so that it becomes possible to cause the light to transmit in the direction of the key parts 7 from the first surface 3b thereby to illuminate the key parts 7 in a suitable manner.

3: With Respect to the Reflectors

In this embodiment, provision is made for the reflectors 9 which serve to cause the lights emitted from the LEDs 2 to enter the interior of the light guiding sheet 3 from one end of the light guiding sheet 3 in an efficient manner. In cases where the light guiding sheet 3 of a thin thickness is used as in this embodiment, the thickness of the light guiding sheet 3 is often thinner than the width of the light emitting region of each LED 2, and in such a case, in order to cause the light emitted from the LED 2 to enter the interior of the light guiding sheet 3 in an efficient manner, too, it is effective to arrange the reflector 9 at a location between the LED 2 and the light guiding sheet 3. In this embodiment, in order to cause the light to enter the light guiding sheet 3 in a more effective manner, at the one end of the light guiding sheet 3, the reflectors 9 are arranged in such a manner as to cover the first surface 3b, but the shapes of the reflectors 9 are not particularly limited.

4: How the Light Advances

Reference will be made to how the light advances or propagates in the light guiding sheet 3 in this embodiment, while referring to FIG. 1(b). FIG. 1(b) is a schematic cross sectional view in which the switch module 1 shown in FIG. 1(a) is enlarged in the vicinity of an LED 2.

The light emitted from the LED 2 is caused to enter the interior of the light guiding sheet 3 from the one end of the light guiding sheet 3 by means of a reflector 9 (here, note that there is also a light which directly enters the interior of the light guiding sheet 3 without by way of the reflector 9). In this embodiment, the first surface 3b and the second surface 3c of the light guiding sheet 3 are both in contact with an air layer, and hence, due to the difference between the indexes of refraction thereof (i.e., when the index of refraction of the air layer is set as 1.0, the index of refraction of the light guiding sheet 3 is about 1.45), the light passing through the interior of the light guiding sheet 3 will advance toward the other end of the light guiding sheet 3, while repeating reflections on the first surface 3b and the second surface 3c, as shown by L1, L2 in the figure. Then, in cases where the white dots 3a exist on the optical path, the light will be scattered around in the white dots 3a, and the light will go out from the interior of the light guiding sheet 3 in the direction of the key parts 7, like the light indicated by L2. Here, note that there is also a light which, after being emitted from the LED 2, transmits through the adhesive layer 10 and comes into the metal dome sheet 4, but this light, too, will be reflected on the surfaces of the metal domes 5, etc., so that it transmits through the adhesive layer 10 and enters again the interior of the light guiding sheet 3.

5: With Respect to the Construction to Reduce the Leakage of Light

Reference will be made to a construction to reduce the "light leakage", which is mentioned as a conventional problem, while referring to FIG. 1(b) and FIG. 1(c). FIG. 1(c) is a view in which the light advancing directions of the lights L3, L4 shown in FIG. 1(b) are schematically illustrated.

As stated above, in the vicinity of the one end of the light guiding sheet 3 close to an LED 2, there exist lights which, after having been reflected on the second surface 3c, transmit through the first surface 3b without being reflected on the first surface 3b (broken line portions of L3, L4 in FIG. 1(b) and FIG. 1(c)), and in the conventional construction, there has been a problem that due to such lights, the vicinity of the one end of the light guiding sheet 3, i.e., a portion of the key substrate 8 in the vicinity of the LED 2, is caused to shine too much. For example, in cases where a reflector such as one in this embodiment is used, there is seen a phenomenon that light leaks out from an edge portion of the reflector. Accordingly, in this embodiment, in order to solve this problem, it is featured that a print pattern 12 by black ink (an ink of a light absorbing property) is formed on the second surface 3c in the vicinity of the one end of the light guiding sheet 3.

More specifically, the print pattern 12 is formed on the second surface 3c and on the optical paths of the lights L3, L4 shown in FIG. 1(b) and FIG. 1(c), i.e., on the optical paths of the lights which, after being reflected on the second surface 3c, transmit through the first surface 3b (the edge portion of the reflector 9) without being reflected on the first surface 3b. Here, note that it may be, for example, a form in which the print pattern 12 is formed on an interface between the adhesive layer 10 and the light guiding sheet 3, as long as it is on the optical paths of the lights leaking out from the first surface 3b (FIG. 1(b))

According to such a construction, the lights L3, L4 leaking out from the edge portion of the reflector 9 can be absorbed in the print pattern 12 formed on the second surface 3c, so it is possible to reduce the light amounts of the lights which leak out from the edge portion of the reflector 9. That is, it is possible to reduce the leakage of light from the vicinity of the one end of the light guiding sheet 3. Note that, here, pattern printing is carried out on the light guiding sheet 3 by means of an inkjet system of the piezo type (360 dpi, a droplet quantity of 14 pl), using, as the print pattern 12, black UV curable ink (including: main or base compound, photo polymerization composition of 70-90% by mass; pigment, carbon black particles of 1-5% by mass; and others, polymerization initiator of 1-5% by mass), and also using Subzero (manufactured by Integration Associates, Inc.) as a UV curing device, but the ink of a light absorbing property is not necessarily limited to black ink, and any ink such as gray ink, navy blue ink, etc., capable of absorbing light in a suitable manner, may be used.

6: With Respect to the Position and Shape of the Print Pattern

Figure 2:
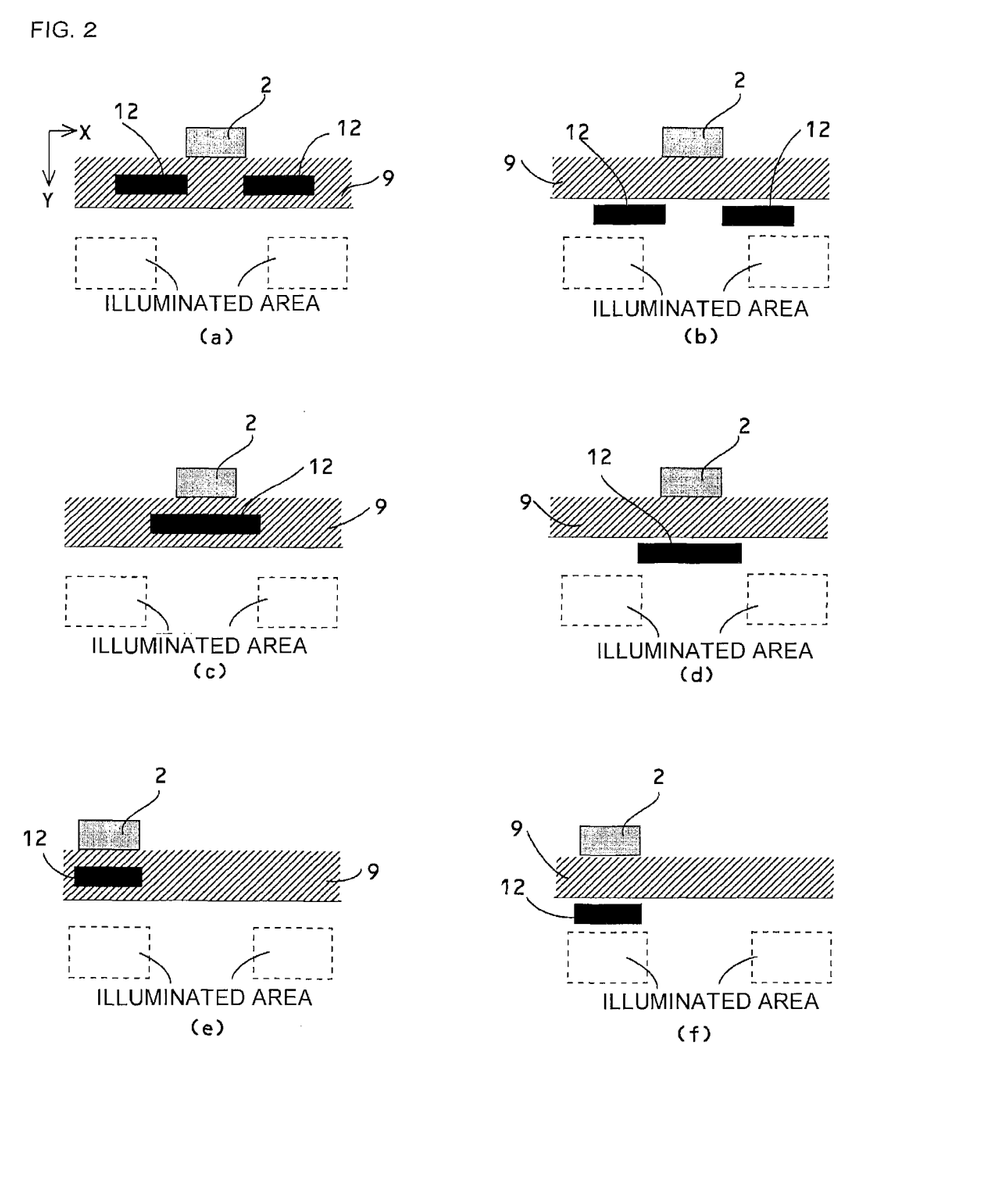
FIG. 2 is a top plan view of the switch module according to the embodiment of the present invention.

The position and shape of the print pattern 12 will be described with reference to FIG. 2. FIG. 2 is a top view of the switch module 1 according to this embodiment, and in particular, is a view schematically showing the position in which the print pattern 12 is formed.

The position in which the print pattern 12 by black ink is formed is not limited in particular, if it is on the second surface 3c and is on the optical path of the light which, after being reflected by the second surface 3c, transmits through the first surface 3b (the edge portion of the reflector 9), without being reflected by the first surface 3b. For example, the print pattern 12 may be formed in a position in which it is hidden in the inside of the reflector 9 at the time when the switch module 1 is seen from an upper surface thereof, as shown in FIG. 2(a), FIG. 2(c), and FIG. 2(e), or the print pattern 12 may also be formed in the outside of the reflector 9, as shown in FIG. 2(b), FIG. 2(d) and FIG. 2(f).

In addition, although "illuminated areas" in FIG. 2(a) through FIG. 2(f) indicate regions corresponding to the key parts 7, respectively, it is more effective when the position in which the print pattern 12 is formed is decided by taking into consideration the relative positional relation between the "illuminated areas" and the LED 2. For example, if the print pattern 12 is formed in a manner such that a slit is made at the front of the LED 2, as shown in FIG. 2(a) and FIG. 2(b), it is possible to allow a larger amount of light to pass in a downward direction (in a Y direction) in the figure from the LED, while suppressing the "illuminated areas" from shining too much. As a result, even key parts 7, which are in positions distant or remote from the LED 2, can be illuminated with a sufficient amount of light. In addition, if the print pattern 12 is formed without a slit being arranged in front of the LED 2, as shown in FIG. 2(c) and FIG. 2(d), it is possible to suppress the "illuminated areas" from shining too much, with more reliability. Moreover, in cases where the "illuminated areas" are located in front of the LED 2, as shown in FIG. 2(e) and FIG. 2(f), if the print pattern 12 is formed in front of the LED 2, it is possible to suppress the "illuminated areas" from shining too much in a suitable manner. That is, the position of the print pattern 12 on the second surface 3c may be anywhere as long as it is a position in which the light leaking out from the "illuminated areas" can be absorbed.

Moreover, in this embodiment, the print pattern 12 is formed in a rectangular shape, as shown in FIG. 2(a) through FIG. 2(f). According to a keen and earnest investigation of the present inventors, it has been found out that when the depth or length (in the direction of Y in FIG. 2) of the print pattern is set to 0.3 mm-0.7 mm, and when the width thereof (in the direction of X in FIG. 2) is set to 5.0 mm, only the light leaking out from the edge portion of the reflector 9 can be absorbed in an effective manner, without interfering in the optical path of other light which illuminates the key parts 7. However, the shape of the print pattern 12 is not limited in particular, but may be, for example, an elliptical shape, a circular shape, a set of dots, etc. Further, with respect to the size or dimensions of the print pattern, too, the dimensions may be such that only the light leaking out from the edge portion of the reflector 9 can be effectively absorbed in view of the angle of emission of the LED 2, the positions of the "illuminated areas", and so on.

7: With Respect to Verification Experiments

Figure 3:
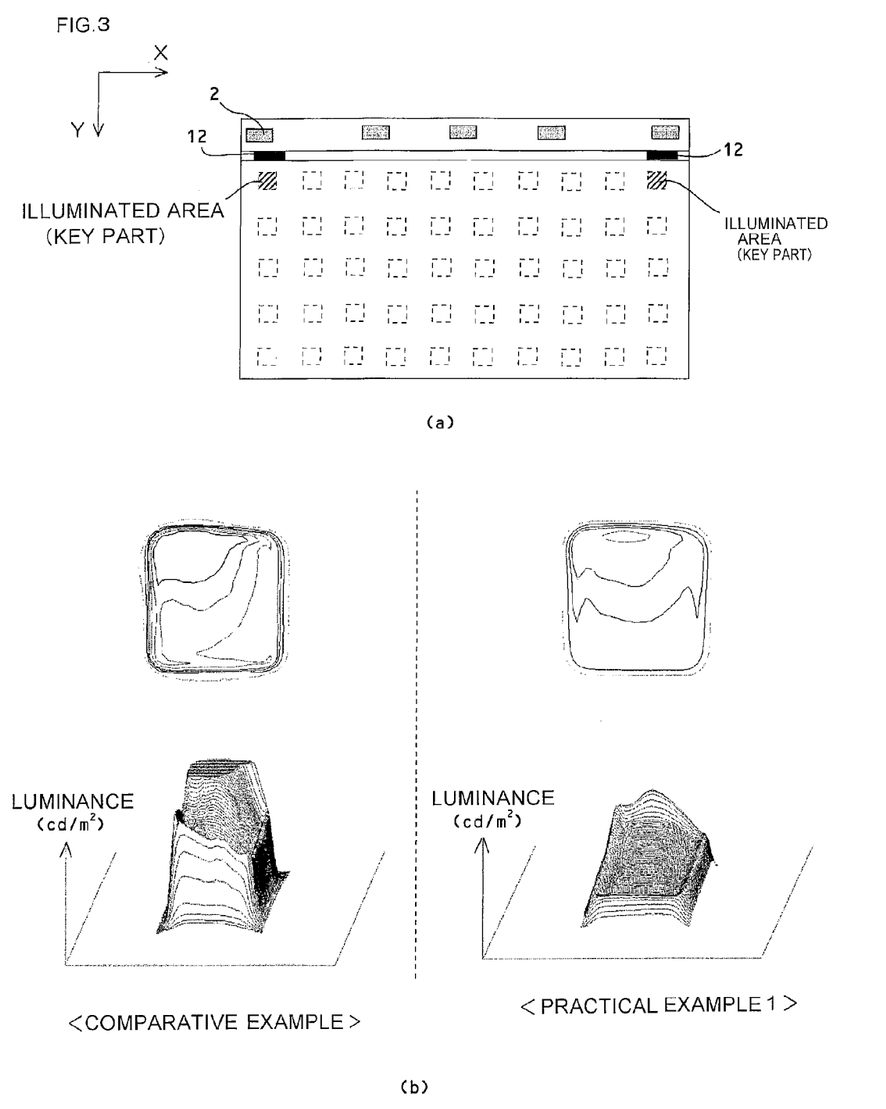
FIG. 3 is a view explaining the effects of the switch module according to the embodiment of the present invention.

With respect to a (comparative example) and a (first practical example) through a (third practical example), respectively, verification experiments were carried out for verifying their effects of suppressing excessive illumination or shining of the "illuminated areas". Hereinafter, the conditions and results of the verification experiments will be explained with reference to FIG. 3(a) and FIG. 3(b). FIG. 3(a) is a schematic diagram showing the "illuminated areas" (areas corresponding to the key parts) and the arrangement of the LEDs 2 used in the verification experiments. FIG. 3(b) shows luminance contour maps in which measurements were made in the (comparative example (left)) and the (first practical example (right)), respectively (an upper side shows views which are seen from an upper surface, and a lower side shows views which are represented in a three-dimensional manner). Note that, here, as a device for the measurement of luminance, there was used a product, RISA-COLOR/ONE II, manufactured by HI-LAND CO., LTD.

COMPARATIVE EXAMPLE

As the comparative example, the luminance (cd/m$^2$) of the "illuminated areas" was measured in the case where print patterns 12 of black ink were not formed, in an arrangement of the "illuminated areas" (the key parts) as shown in FIG. 3(a). According to a keen and earnest investigation of the inventors, a remarkable phenomenon of "excessive luminance" (shining too much) occurs in the "illuminated areas" (areas shown by diagonally shaded parts) which are in the upper left and in the upper right, respectively, among a plurality of "illuminated areas" illustrated, as a result of which it is confirmed that the "uniformity in luminance" of a satisfactory level can not be achieved. Accordingly, with respect to the "illuminated areas" in the upper left and in the upper right, a luminance comparison was made between the (comparative example) and the (first practical example) through the (third practical example), respectively. Here, note that in the (comparative example), the luminance of the "illuminated area" in the upper left is 39.6 cd/m$^2$, and the luminance of the "illuminated area" in the upper right is 37.2 cd/m$^2$, so it has been found out that these areas exhibit high luminance as compared with the luminance of the other "illuminated areas". Moreover, it has been verified that, from a local point of view, an upper left region close to the LED 2 in the "illuminated area" of the upper left, and an upper right region close to the LED 2 in the "illuminated area" of the upper right, respectively shine extremely too much.

FIRST PRACTICAL EXAMPLE

In the first practical example, print patterns 12 of black ink were formed, as shown in FIG. 3(a), and the dimension in the depth (in the direction of Y in the figure) of each of the print patterns 12 was set to 0.5 mm, and the dimension in the width thereof (in the direction of X in the figure) was set to 4.0 mm. As a result of the measurement of luminance under these conditions, it has been verified that the luminance of the "illuminated area" in the upper left greatly dropped to 22.0 cd/m$^2$ (39.6 cd/m$^2$ in the comparative example), and the luminance of the "illuminated area" in the upper right greatly dropped to 23.0 cd/m$^2$ (37.2 cd/m$^2$ in the comparative example). In addition, in the other "illuminated areas", a drop of luminance was hardly seen. That is, it has been found out that the "shining too much" can be suppressed and the requirement for the "uniformity in luminance" can be satisfied.

SECOND PRACTICAL EXAMPLE

In the second practical example, in the print patterns 12 of black ink shown in FIG. 3(a), the dimension in the depth (in the direction of Y in the figure) of each of the print patterns 12 was set to 0.7 mm, and the dimension in the width thereof (in the direction of X in the figure) was set to 4.0 mm. As a result of the measurement of luminance under these conditions, it has been verified that the luminance of the "illuminated area" in the upper left greatly dropped to 21.5 cd/m$^2$ (39.6 cd/m$^2$ in the comparative example), and the luminance of the "illuminated area" in the upper right greatly dropped to 21.0 cd/m$^2$ (37.2 cd/m$^2$ in the comparative example). In addition, in the other "illuminated areas", a drop of luminance was hardly seen. That is, it has been found out that the "shining too much" can be suppressed and the requirement for the "uniformity in luminance" can be satisfied.

THIRD PRACTICAL EXAMPLE

In the third practical example, in the print patterns 12 of black ink shown in FIG. 3(a), the dimension in the depth (in the direction of Y in the figure) of each of the print patterns 12 was set to 0.3 mm, and the dimension in the width thereof (in the direction of X in the figure) was set to 4.0 mm. As a result of the measurement of luminance under these conditions, it has been verified that the luminance of the "illuminated area" in the upper left greatly dropped to 25.7 cd/m$^2$ (39.6 cd/m$^2$ in the comparative example), and the luminance of the "illuminated area" in the upper right greatly dropped to 24.8 cd/m$^2$ (37.2 cd/m$^2$ in the comparative example). In addition, in the other "illuminated areas", a drop of luminance was hardly seen. That is, it has been found out that the "shining too much" can be suppressed and the requirement for the "uniformity in luminance" can be satisfied.

Next, in FIG. 3(b), there are shown the luminance contour maps of the "illuminated area" in the upper left of FIG. 3(a), in the (comparative example) and the (first practical example). In FIG. 3(b), what are shown therein at the upper side are the luminance contour maps in cases where the "illuminated area" in the upper left is seen from the upper surface, and what are shown therein at the lower side are the three-dimensional luminance contour maps of the "illuminated area" in the upper left. As shown, it is understood that in the (comparative example), luminance is high in the entire "illuminated area", and in particular, an upper left region thereof close to the LED 2 exhibits extremely high luminance. On the other hand, it can be understood that in the (first practical example), luminance is low as a whole. That is, it is understood that the formation of the print pattern 12 of black ink can suppress the "shining too much" in a reliable manner.

8: With Respect to the Effects of this Embodiment

According to the switch module 1 of this embodiment, it becomes possible to obtain the following effects which have not been able to be obtained with the conventional construction.

(With Respect to Restrictions on an Arrangement Design and an Aesthetic Design of the Key Parts)

According to the switch module 1 of this embodiment, with the above-mentioned construction, it is possible to reduce the amount of light of the light leaking out from the vicinity of the one end of the light guiding sheet 3. Therefore, in the conventional construction, there arises a problem that when key parts are arranged at locations close to LEDs, the key parts in the vicinity of the LEDs are shined extremely too much by the light which has leaked out, as a result of which there has occurred restrictions on an arrangement design and an aesthetic design in which the key parts could not be arranged close to the LEDs. However, in this embodiment, even if the key parts 7 are arranged close to the LEDs 2, there will be no such a problem of shining too much. Thus, it is possible to narrow a distance a (i.e., an interval between an LED 2 and a key part 7 nearest to the LED 2) as shown in FIG. 1(b), i.e., to arrange the key part 7 at a location close to the LED 2, so that the restrictions on the arrangement design as well as the aesthetic design of the key parts can be eased.

Figure 4:
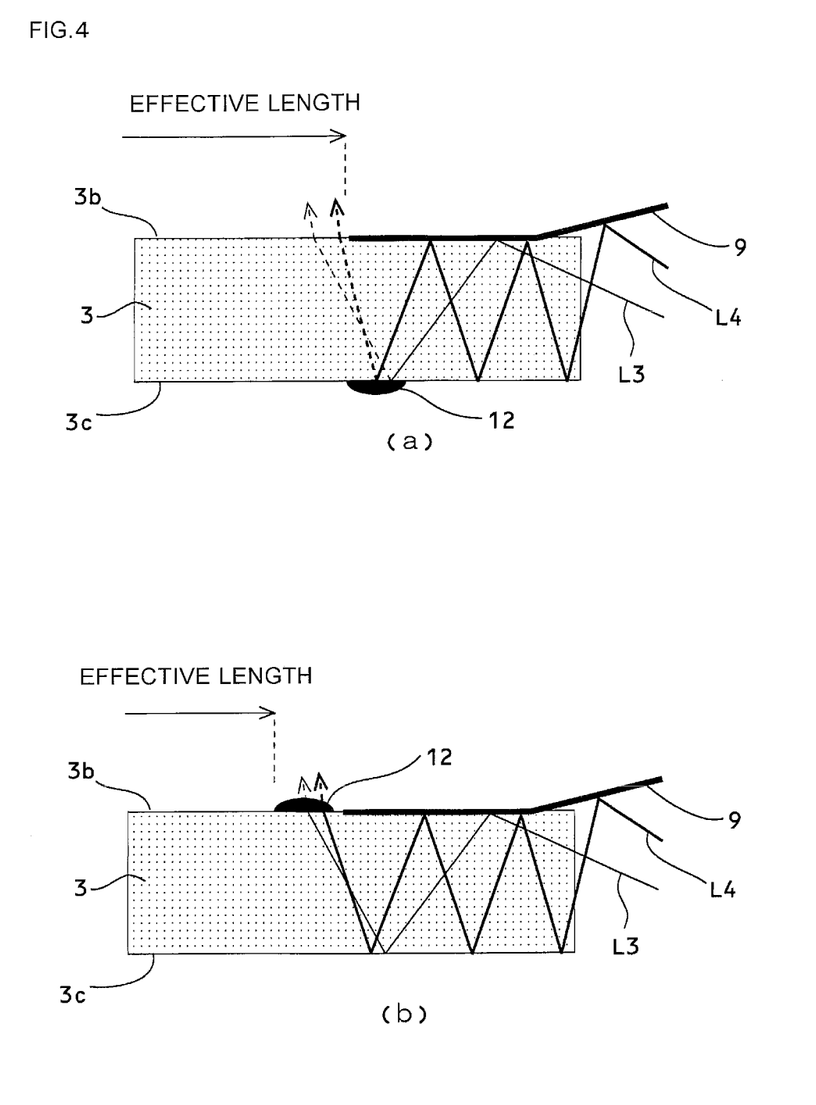
FIG. 4 is a view explaining the effects of the switch module according to the embodiment of the present invention.

Moreover, in this embodiment, the print pattern 12 by black ink is formed on the second surface 3c of the light guiding sheet 3. From the point of view of reducing the light leaking out from the vicinity of the one end of the LED 3, it is also considered to form the print pattern on the first surface 3b, but between both of these formations, there will occur a large difference in restrictions on the arrangement design and the aesthetic design of the key parts. Now, this will be explained below with reference to FIG. 4. FIG. 4(a) shows the construction of this embodiment (i.e., the print pattern 12 is formed on the second surface 3c), and FIG. 4(b) shows the construction of a comparative example (i.e., the print pattern 12 is formed on the first surface 3b). As shown in these figures, it will be understood that this embodiment is longer in the "effective length" of the light guiding sheet 3 than the comparative example. The "effective length" of the light guiding sheet 3 refers to the length of a region in which the light guided to the interior of the light guiding sheet 3 can emit from the first surface 3b, and in other words, it can be said to be the length of a region in which the key parts 7 are able to be illuminated, and the longer this length, the more a region in which the key parts 7 are able to be arranged will expand. Therefore, in comparison with the comparative example, the key parts 7 can be arranged in a much wider range in this embodiment, and hence it becomes possible to ease the restrictions on the arrangement design and the aesthetic design of the key parts.

(With Respect to Uniformity in Luminance)

According to this embodiment, it is possible to suppress the phenomenon that key parts 7 arranged in the vicinity of the LEDs 2 shine extremely too much as compared with the other key parts 7. In addition, the print pattern 12 of black ink formed on the second surface 3c is formed only on the optical path of the light leaking out from the vicinity of the one end of the light guiding sheet 3 (the edge portion of the reflector 9), so there is no influence on other lights (e.g., L1 and L2 in FIG. 1(b)) for illuminating the key parts 7 in any way, and even those key parts 7 which are remote from the LED 2 can be illuminated with a sufficient amount of light. As a result, the plurality of the key parts 7 arranged on the key substrate 8 can be illuminated with substantially uniform luminance, so it becomes possible to satisfy the requirement for the "uniformity in luminance".

(With Respect to Manufacturing Efficiency and Manufacturing Costs)

In this embodiment, the white dots 3a as light scattering processing are printed on the second surface 3c of the light guiding sheet 3. In this case, the white dots 3a and the print pattern 12 of black ink are printed on the same surface (the second surface 3c) of the light guiding sheet 3 by means of ink jetting, as a result of which, in a manufacturing process, it is possible to print the white dots 3a and the print pattern 12 of black ink on the same surface by the use of the same manufacturing equipment (printing equipment) within the same step, and this leads to improvement in the manufacturing efficiency, and reduction in the manufacturing costs. In addition, it is necessary to print the white dots 3 and the print pattern 12 on the light guiding sheet 3 with good positional accuracy, but in this embodiment, these can be printed within the same step, so the accuracy in the positions of these can be increased without the need of a complicated position alignment operation. Moreover, in cases where the three-dimensional shape processing is applied, as the light scattering processing, to the first surface 3b, too, in a manufacturing process, it is possible to print the print pattern 12 of black ink on the second surface 3c, while carrying out the three-dimensional shape processing, so it is possible to improve manufacturing efficiency and to reduce manufacturing costs.

As described above, according to this embodiment, in a switch module which is arranged in opposition to a key substrate, it becomes possible to provide the switch module which is able to reduce an amount of light leaking out from the vicinity of an end of a light guiding member in the direction of key parts, so that the key parts can be illuminated in a uniform manner by the light which advances in the interior of the light guiding member.

EXPLANATION OF REFERENCE NUMERALS AND CHARACTERS

1 . . . switch module, 2 . . . LEDs, 3 . . . light guiding sheet, 3a . . . white dots, 3b . . . first surface, 3c . . . second surface, 4 . . . metal dome sheet, 5 . . . metal domes, 6 . . . circuit substrate, 7 . . . key parts, 8 . . . key substrate, 9 . . . reflectors, 10 . . . adhesive layer, 11 . . . electrodes, 12 . . . print pattern.

The invention claimed is:

1. A switch module which is arranged in opposition to a key substrate having key parts, comprising:
    a circuit substrate that has an electrode layer formed on a surface thereof in opposition to said key substrate;
    a light guiding member that is arranged between said key substrate and said circuit substrate;
    a light source element that emits light; and
    a reflection member that causes the light emitted from said light source element to enter an interior of said light guiding member from an end of said light guiding member;
    wherein by a movement of said key parts with respect to said electrode layer, an on and off of a switch is changed over, and at the same time, said key parts can be illuminated from the interior of said light guiding member by the light which has entered the interior of said light guiding member;
    wherein said light guiding member has a first surface that is arranged in opposition to said key substrate, and a second surface that is arranged at an opposite side of said first surface so as to be in opposition to said circuit substrate; and
    wherein in the vicinity of said end in the second surface, there is formed a print pattern by ink of a light absorbing property on an optical path of the light which has been caused to enter the interior of said light guiding member by means of said reflection member, and which, after being reflected on the second surface, transmits through the first surface in the vicinity of said end, without being reflected on the first surface.

2. The switch module as set forth in claim 1, wherein
    said reflection member is arranged so as to cover the first surface in said end; and
    said print pattern is formed on the second surface on an optical path of the light which has been caused to enter the interior of said light guiding member by means of said reflection member, and which, after being reflected on the second surface, transmits through the first surface from the vicinity of an edge portion of said reflection member.

3. The switch module as set forth in claim 2, wherein said light guiding member is subjected to light scattering processing which is able to scatter the light having entered the interior of said light guiding member, and said key parts are able to be illuminated from the interior of said light guiding member by the light scattered in a portion thereof to which said light scattering processing has been applied.

4. The switch module as set forth in claim 2, wherein a sheet member with light transparency having a thickness of equal to or more than 100 μm and equal to or less than 300 μm is used for said light guiding member.

5. The switch module as set forth in claim 1, wherein
    said light guiding member is subjected to light scattering processing which is able to scatter the light having entered the interior of said light guiding member, and said key parts are able to be illuminated from the interior of said light guiding member by the light scattered in a portion thereof to which said light scattering processing has been applied.

6. The switch module as set forth in claim 5, wherein
    said light scattering processing is
    printing processing in which ink having a light scattering property is printed on said light guiding member, or
    three-dimensional shape processing in which a three-dimensional shape having a light scattering property is formed on said light guiding member.

7. The switch module as set forth in claim 6, wherein said light scattering processing is applied to the second surface of said light guiding member.

8. The switch module as set forth in claim 6, wherein a sheet member with light transparency having a thickness of equal to or more than 100 μm and equal to or less than 300 μm is used for said light guiding member.

9. The switch module as set forth in claim 5, wherein said light scattering processing is applied to the second surface of said light guiding member.

10. The switch module as set forth in claim 9, wherein a sheet member with light transparency having a thickness of equal to or more than 100 μm and equal to or less than 300 μm is used for said light guiding member.

11. The switch module as set forth in claim 5, wherein a sheet member with light transparency having a thickness of equal to or more than 100 μm and equal to or less than 300 μm is used for said light guiding member.

12. The switch module as set forth in claim 1, wherein a sheet member with light transparency having a thickness of equal to or more than 100 μm and equal to or less than 300 μm is used for said light guiding member.

* * * * *

UNITED STATES PATENT AND TRADEMARK OFFICE
CERTIFICATE OF CORRECTION

PATENT NO. : 8,545,080 B2
APPLICATION NO. : 13/497160
DATED : October 1, 2013
INVENTOR(S) : Manabu Ohrui et al.

It is certified that error appears in the above-identified patent and that said Letters Patent is hereby corrected as shown below:

Title page, Item (75) Inventors:

Correct: "Kazuki Ozaki, Minato-Ku (JP)"

to -- Kazuyuki Ozaki, Minato-Ku (JP) --

Signed and Sealed this
Seventeenth Day of December, 2013

Margaret A. Focarino
*Commissioner for Patents of the United States Patent and Trademark Office*